July 7, 1970
W. ACHERMANN ET AL
3,519,190
COLLAPSIBLE PALETTE BOX MADE OF CORRUGATED
CARDBOARD AND THE LIKE
Filed Feb. 13, 1968
7 Sheets-Sheet 1
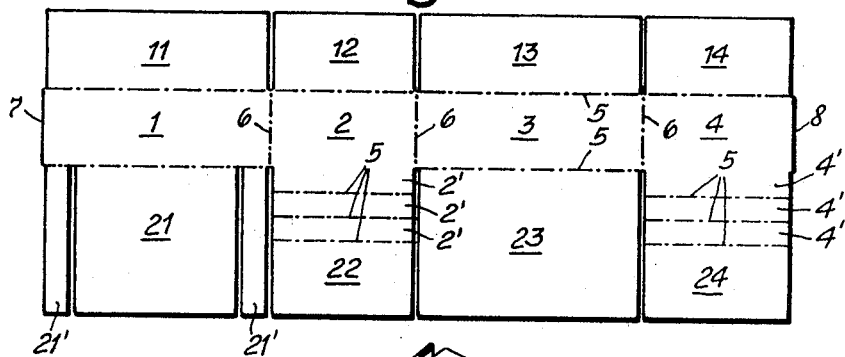
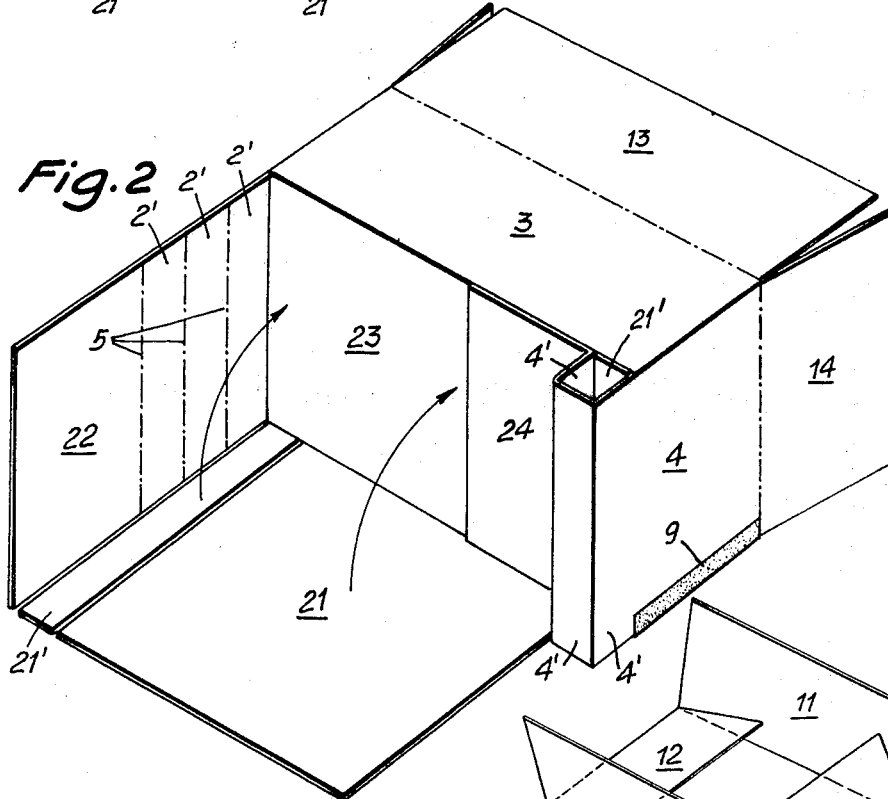
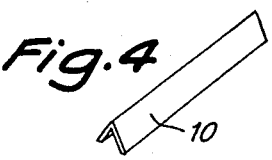
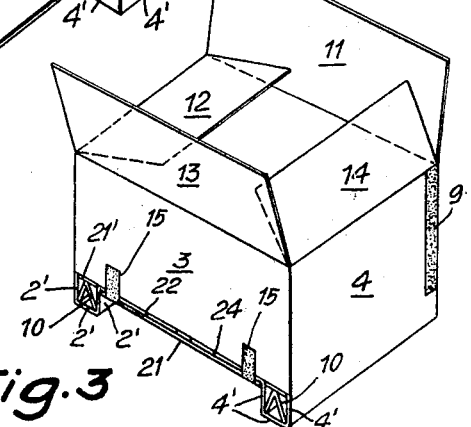
INVENTORS
WERNER ACHERMANN &
FRANZ ACHERMANN
BY *Lowry, Rinehart & Markva*
ATTORNEYS

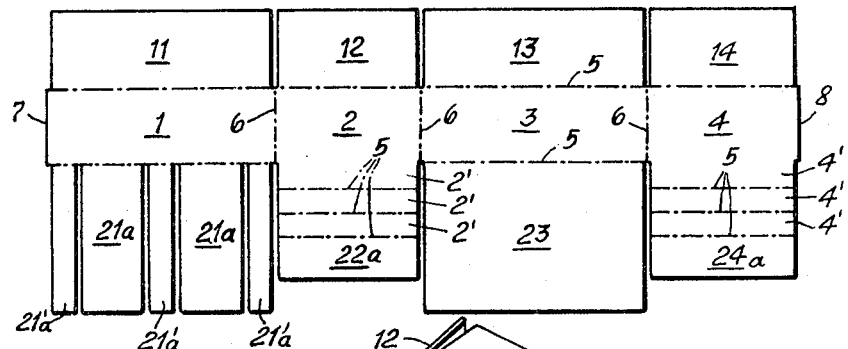
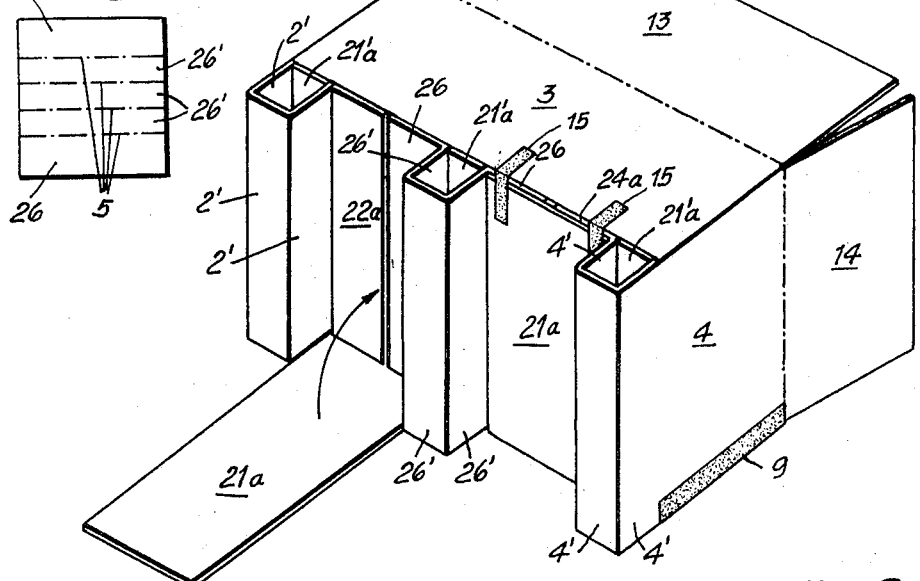
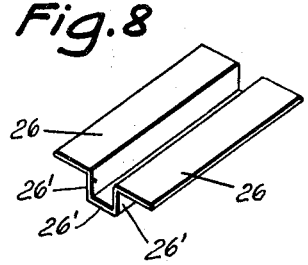
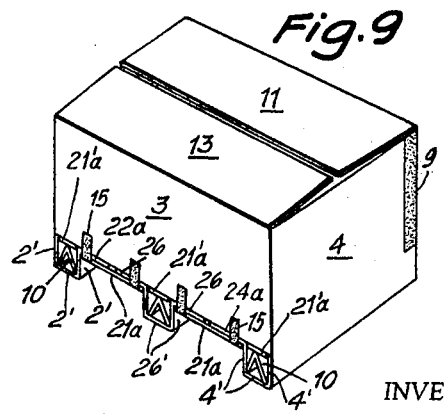
INVENTORS
WERNER ACHERMANN &
FRANZ ACHERMANN
BY Lowry, Rinehart + Markva
ATTORNEYS

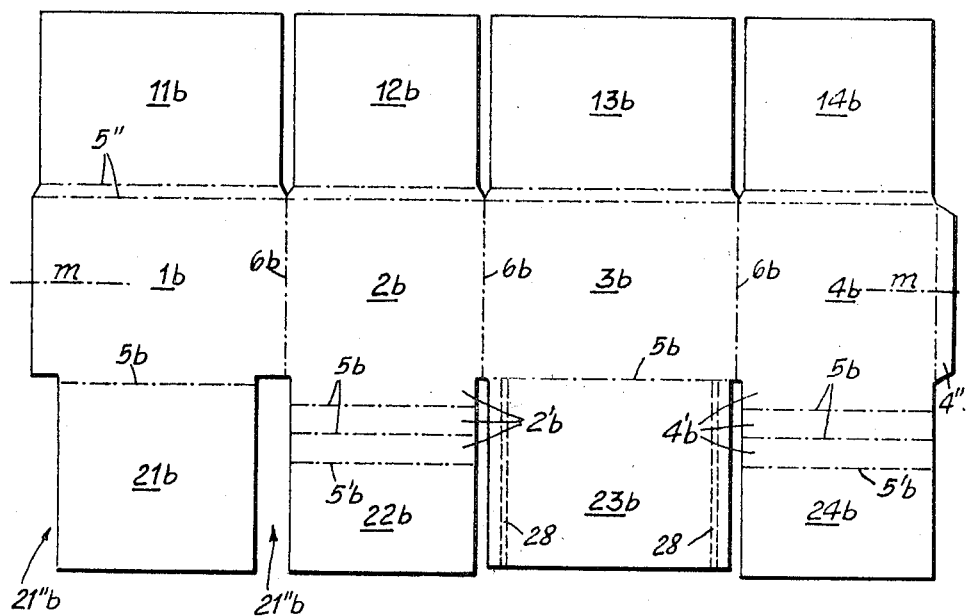
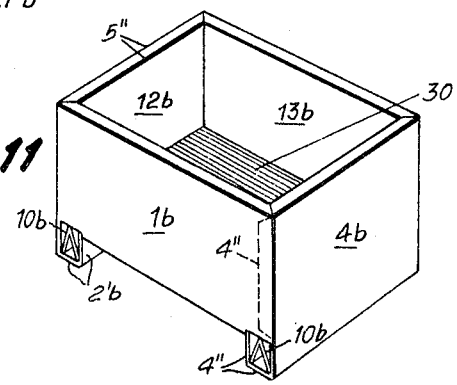
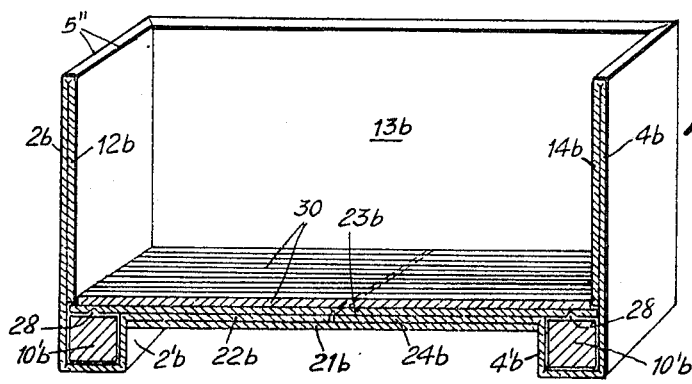

July 7, 1970 W. ACHERMANN ET AL 3,519,190
COLLAPSIBLE PALETTE BOX MADE OF CORRUGATED
CARDBOARD AND THE LIKE
Filed Feb. 13, 1968 7 Sheets-Sheet 5

INVENTORS
WERNER ACHERMANN +
FRANZ ACHERMANN

BY Lowry, Rinehart + Markeva
ATTORNEYS

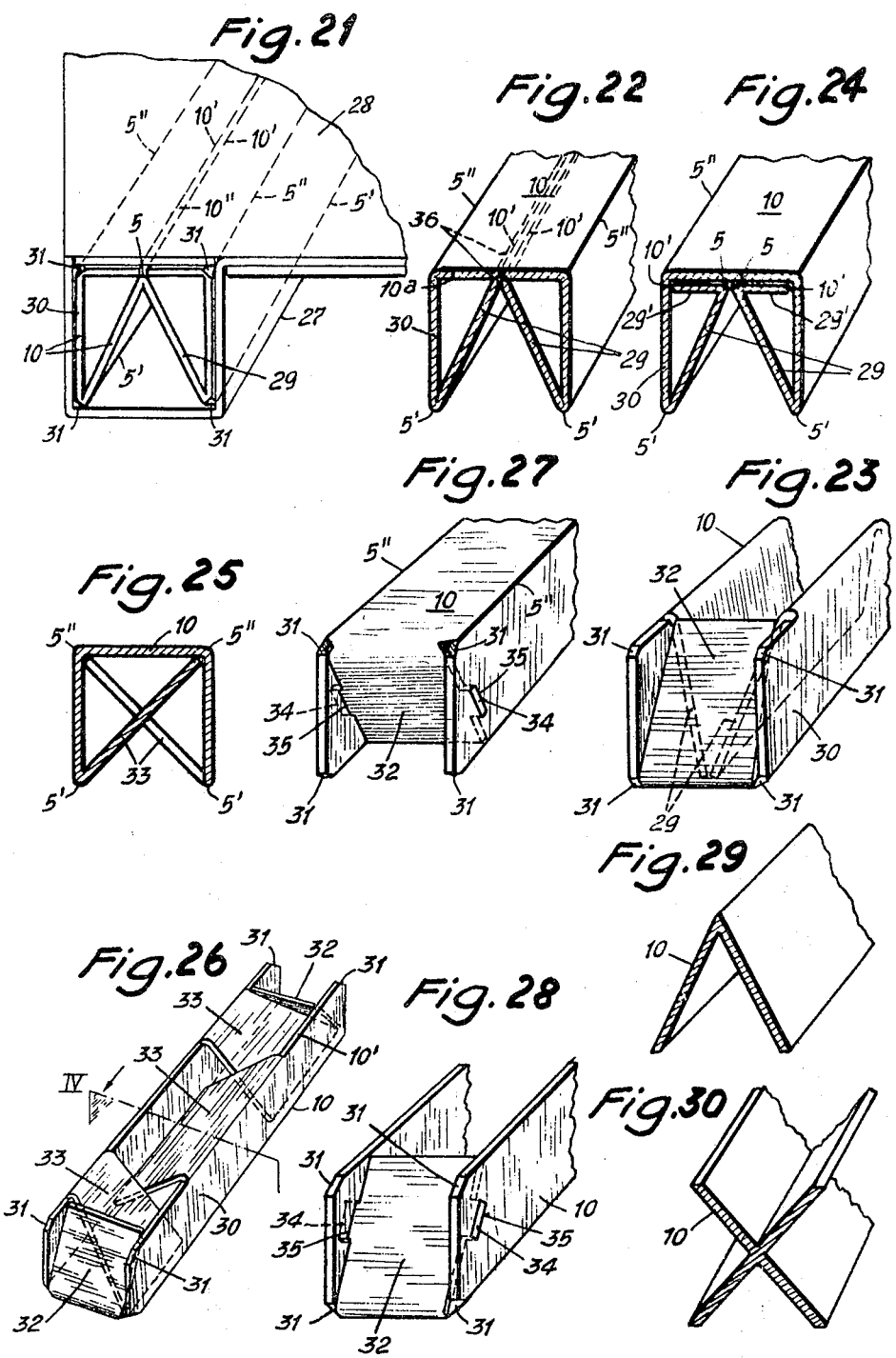

July 7, 1970    W. ACHERMANN ET AL    3,519,190
COLLAPSIBLE PALETTE BOX MADE OF CORRUGATED
CARDBOARD AND THE LIKE
Filed Feb. 13, 1968                      7 Sheets-Sheet 7
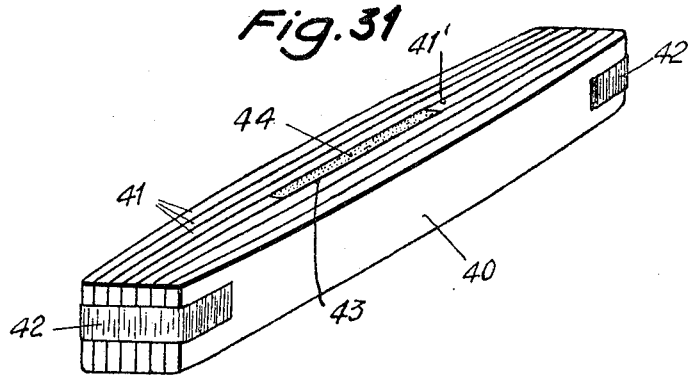
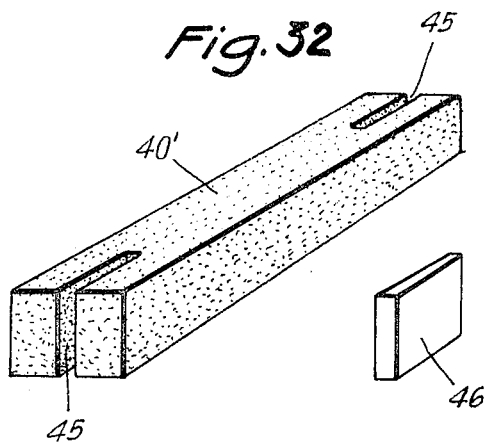
INVENTORS
WERNER ACHERMANN
FRANZ ACHERMANN
BY *Lowry, Rinehart & Markva*
ATTORNEYS United States Patent Office 3,519,190
Patented July 7, 1970

3,519,190
COLLAPSIBLE PALETTE BOX MADE OF CORRUGATED CARDBOARD AND THE LIKE
Werner Achermann and Franz Achermann, both of 71 Rumlangstrasse, 8052 Zurich, Switzerland
Filed Feb. 13, 1968, Ser. No. 705,071
Int. Cl. B65d 5/02
U.S. Cl. 229—37                     28 Claims

ABSTRACT OF THE DISCLOSURE

This disclosure provides a collapsible palette box which has four wall panels connected side by side to form a rectangular container. Each of the wall panels includes a top section, a side wall section and a bottom section. The several wall sections are separated by folding lines. A first wall panel has a folded bottom section which forms an inner bottom ply of the box bottom. A second and third wall panel are located on opposite sides of the box with respect to each other and have folded bottom sections. These opposed bottom sections form a hollow brace joist along opposite bottom edges of the box bottom and at least a portion of the opposed bottom sections comprise an intermediate bottom ply juxtaposed said inner box bottom ply. A fourth wall panel is located opposite the first wall panel and has a folded bottom section which forms an outer box bottom ply juxtaposed said intermediate ply. The disclosure also provides a collapsible palette box blank to form the palette box of the disclosure.

BACKGROUND OF THE INVENTION

Collapsible boxes made of corrugated cardboard, impregnated plain cardboard and the like, which have a reinforced bottom are well known. These prior art boxes have reinforced bottoms which are in the form of a pallet. The several parts of the prior art collapsible boxes require the use of fasteners or connecting means which make use of adhesive material. The assembling of such separated plurality of parts is time consuming and therefore extremely expensive.

PURPOSE OF THE INVENTION

The primary object of this invention is to produce a collapsible pallet box which has a very simple construction.

Another object of this invention is to produce a pallet box which is constructed of corrugated cardboard, impregnated flat cardboard and the like, which may be manufactured on machines available in the prior art.

A still further object of this invention is to provide a collapsible pallet box blank that may be folded into an integral pallet box while using a minium amount of fasteners or adhesive connecting means.

A still further object of this invention is to produce an improved collapsible pallet box which may be assembled in a minimum amount of time and at minimum production cost.

SUMMARY OF THE INVENTION

These objects and other advantages corresponding of the purpose of the invention are readily achieved by the collapsible pallet box and blank for forming same made in accordance with this invention. The collapsible pallet box consists of four wall panels which are connected side by side to form a rectangular container. Each of the wall panels includes a top section, a side wall section and a bottom section which are separated by folding lines. A first wall panel includes a bottom section which forms an inner bottom ply of the pallet box bottom. A second and third wall panel are located on opposite sides of the box with respect to each other and include folded bottom sections. These opposed folded bottom sections form a hollow brace joist along opposite bottom edges of the box bottom. At least a portion of these folded opposed bottom sections comprises an intermediate bottom ply juxtaposed the inner box bottom ply. The fourth wall panel is located opposite the first wall panel and includes a folded bottom section which forms an outer box bottom ply juxtaposed the intermediate ply. This structure provides a three ply box bottom.

Another feature of this invention is directed to a blank which may be used to form the collapsible pallet box of this invention. This pallet box blank comprises a continuous one-piece sheet of the box material which has four distinct wall panels. Each of the wall panels includes a top section, a side wall section and a bottom section which are separated by fold lines. A first wall panel in the single piece blank has a bottom section which is used to form an inner bottom ply when folded along the appropriate fold line. A second and third wall panel each have a bottom section which includes fold lines to form a hollow brace joist along one bottom edge of the box. At least a portion of the bottom sections of the second and third wall panels forms an intermediate bottom ply which is juxtaposed the inner bottom ply of the box. A specific embodiment of this invention uses a narrow width on the second and third wall panels while the first wall panel and a fourth wall panel are the broader sides of the box to be produced. The two free ends of the blank are brought together when the various wall panels are folded along respective fold lines. The various connecting points, including the free ends of the box blank and the edges of the three ply box bottom, require only connecting means such as adhesive tape or flap structures used in combination with an adhesive material such as glue.

The use of such heavy fastening means as rivets and fastener clamps may be avoided in the production of the pallet box of this invention. Therefore the production thereof is much more efficient and much less expensive than present manufacturing processes used in the prior art.

BRIEF DESCRIPTION OF DRAWINGS

Other objects of this invention will appear in the following descirption and appended claims, reference being made to the accompanying drawings forming a part of the specification wherein like reference characters designate corresponding parts in the several views.

FIG. 1 is a plan view of a pallet box blank made in accordance with this invention, FIG. 2 is a perspective view of a partially constructed pallet box made in accordance with this invention, FIG. 3 is a perspective view of the completely assembled box of FIG. 2, FIG. 4 is a perspective view of a reinforcing member used in combination with the pallet box made in accordance with this invention, FIG. 5 is a plan view of another embodiment of a pallet box blank made in accordance with this invention, FIG. 6 is a plan view of a blank used for a reinforcement joist used in combination with the blank of FIG. 5, FIG. 7 is a perspective view of a partially assembled box made from the blanks as shown in FIGS. 5 and 6, FIG. 8 is a perspective view of a bracing joist made from the blank as shown in FIG. 6, FIG. 9 is a perspective view of a completely assembled box as shown in FIG. 7, FIG. 10 is a plan view of another embodiment of a pallet box blank made in accordance with this invention, FIG. 11 is a perspective view of a completely assembled box made from the blank as shown in FIG. 10, FIG. 12 is a perspective view in cross-section through the box as shown in FIG. 11, FIG. 21 is a partial view of a box made in accordance with this invention showing the box bottom in combination with a reinforcing member inserted in a bracing joist, FIG. 22 is a cross-sectional view through another embodiment of a reinforcing member which may be used in the bracing joist of this invention, FIG. 23 is a perspective partial view of the reinforcing member as shown in FIG. 22 as seen from below and one end thereof, FIG. 24 is a cross-sectional view through another embodiment of a reinforcing member used in the bracing joist of this invention, FIG. 25 is a cross-sectional view along sectional plane IV of FIG. 26, FIG. 26 is a perspective view of another embodiment of a reinforcing member of this invention, FIGS. 27 and 28 are perspective views of a still further embodiment of another reinforcing member from the top and bottom thereof, respectively, FIGS. 29 and 30 are perspective partial views of still further embodiments of reinforcing members made in accordance with this invention, FIG. 31 is a perspective view of a still further embodiment of a reinforcing member used in the bracing joist of this invention, and FIG. 32 is a perspective view of still another embodiment of a reinforcing member used in the bracing joist of this invention.

DESCRIPTION OF SPECIFIC EMBODIMENTS

Figure 13:
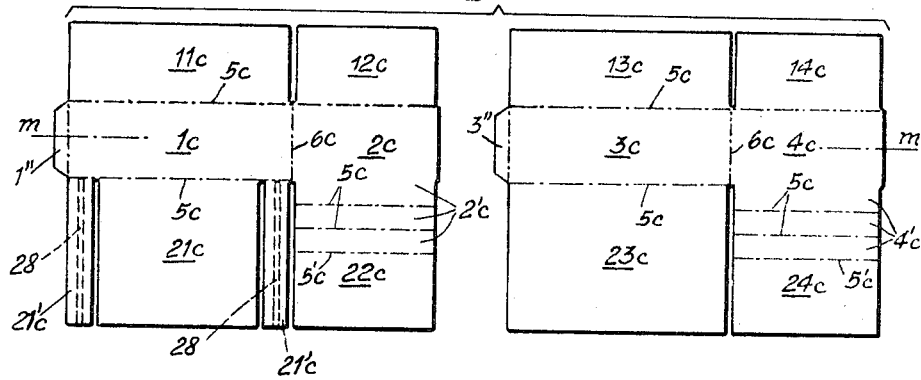
FIG. 13 is a plan view of a two-piece pallet box blank made in accordance with this invention.

More specifically, a collapsible pallet box is shown constructed from a single, one-piece corrugated cardboard blank in FIGS. 1 through 4. The corrugations may extend in a vertical direction of the box or across the longitudinal direction of the blank as it is shown in FIG. 1. The collapsible box of this embodiment includes four wall panels which are separated from each other by fold lines 6. The wall panels include top sections 11, 12, 13 and 14, side wall sections 1, 2, 3 and 4, and bottom sections 21, 22, 23 and 24, respectively. The bottom section 21 includes a tongue section 21' that is located along the top length of each of the hollow brace joists 2' and 4' in the completely constructed box as shown in FIGS. 2 and 3. The top sections 11, 12, 13 and 14 and the bottom sections 21, 22, 23 and 24 are separated from the side wall sections 1, 2, 3 and 4 by fold lines 5 respectively. The top sections 11, 12, 13 and 14 form cover parts in the completed box. There are three fold lines 5 separating the bottom sections 22 and 24 from the respective side wall sections 2 and 4. When the fold lines 5 are folded as shown in FIGS. 2 and 3, the brace joist sections 2' and 4' form a hollow brace joist along the bottom edges of the completely constructed box.

The construction of the box of this embodiment is accomplished by first placing the exterior side edges 7 and 8 against each other to close the blank into a rectangular shape. The exterior side edges 7 and 8 are secured to each other with an adhesive tape 9. The bottom of the box is formed of three superimposed plies as follows. The bottom section 23 is first bent at right angles about the fold line 5. This bottom section 23 forms the inner bottom ply of the completed box bottom. The tongue sections 21' are then turned down at right angles over the bottom section 23 along each edge thereof. The bottom sections 22 and 24 and the respective joist sections 2' and 4' are then bent down along the fold lines 5 as shown in FIG. 2. The amount of cardboard used in the area of the bottom sections 22 and 24 is substantially equal to the amount of cardboard used in the formation of the brace joists 2' and 4' respectively. The bottom sections 22 and 24 are juxtaposed the bottom section 23 and thereby form an intermediate bottom ply for the completed box bottom. The bottom section 21 is then finally turned down along the fold line separating it from the side wall section 1 to form the outer ply of the three ply box bottom. The exterior edge of the bottom section 21 is fixed to the side wall section 3 with adhesive tapes 15 as shown in FIG. 3.

The exterior wall portions of the hollow joists 2' and 4' are formed by an integral extension of the side wall portions 2 and 4 respectively. The tongue sections 21' which were placed along the outer edges of the bottom section 23 form a spacer member for the interior wall portions of the bracing joist 2' and 4'. The exterior marginal portion of the tongue sections 21' may also be secured to the side wall section 3 with adhesive tape if desired.

The stiffener insert 10 is shown as an angle section to be placed in the hollow bracing joists 2' and 4'. These stiffener inserts 10 may be made of cardboard and serve as reinforcements for the joists 2' and 4'. These stiffener inserts may also be made of such things as plastic or wood where there are heavier goods to be transported or stored in the collapsible box. These inserts 10 may have been placed either in the joists 2' and 4' after they have been formed or may actually have been wrapped up in the joists 2' and 4' during the folding operation.

Another embodiment of a collapsible box made in accordance with this invention is shown in FIGS. 5 through 9. The primary distinction in the blank of this embodiment over the blank of the first embodiment is that the bottom sections 22a and 24a do not extend outwardly along the edges thereof the same distance as the bottom sections 21a and 23. In addition, there are three tongue sections 21a' which are used to form spacer inserts in the respective bracing joists 2', 26' and 4' as shown in FIG. 7.

The blank for a third bracing joist 26 is shown in FIG. 6 having four fold lines 5. The folded third bracing joist blank 26' is shown in FIG. 8. The flange sections 26 are juxtaposed the folded bottom section 23 to form a portion of the intermediate ply along with the bottom sections 22a and 24a as shown in FIG. 7. The folding operation is substantially the same in this embodiment as in the first embodiment. Here, however, there are three tongue sections 21a' which are folded over the bottom section 23, in addition there are two bottom portions 21a which are folded and are attached at their outer edges to the side wall section 3 with adhesive tapes 15. The stiffeners 10 are placed in all three of the bracing joists 2', 4' and 26' as shown in FIG. 9, thereby providing a very substantial support to the collapsible pallet box of this embodiment.

The embodiments as discussed hereinabove show the structure of the bracing joists 2' and 4' to include continuous extensions of the side wall portions 2 and 4 respectively without any steps located therein. The structure of the collapsible box of this invention does not require a positive connection between the bracing joists 2' and 4' directly to the other parts of the box. That is, they are securely held in place through the use of the intermediate plies formed from bottom sections 22, 24, 22a and 24a. It is absolutely unnecessary to use fasteners or adhesive material to maintain the structure of the bracing joists 2' and 4'. Herein lies a basic advantage of the collapsible pallet box of this invention over those boxes of similar types known in the prior art.

Another embodiment of the callapsible pallet box and a blank therefor is shown in FIGS. 10, 11 and 12. The one-piece corrugated cardboard blank shown in FIG. 10 is asymmetric with respect to the center line *m*. The top sections 11*b*, 12*b*, 13*b* and 14*b* are separated from the respective side wall sections 1*b*, 2*b*, 3*b* and 4*b* by the double fold 5″. An open top box as shown in FIGS. 11 and 12 is formed when the top sections 11*b*, 12*b*, 13*b* and 14*b* are folded over 180° to form a double wall structure as shown in FIG. 12. The additional width of such a double wall structure is provided for along the bottom section 21*b* by the recesses 21*b*″.

In this specific embodiment, guide grooves 28 are provided on the underside of the bottom section 23*b*. When folded to form a first ply in the box bottom, the guide grooves 28 are located in the bracing joists 2*b*′ and 4*b*′. The guide grooves 28 receive the vertex edge of the stiffener insert 10 as shown in FIG. 11.

Figure 20:
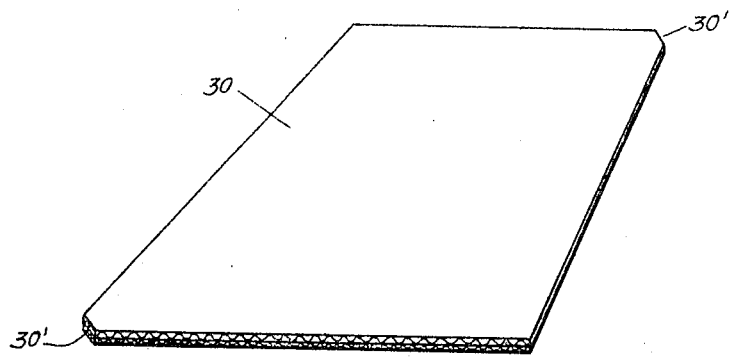
FIG. 20 is a perspective view of an insert bottom which may be used in a box made in accordance with this invention.

The edges of the side wall sections 1*b* and 4*b* are held together with adhesive material located on the flap 4″. The exterior edge of the bottom section 21*b* is fixed to the side wall section 3*b* with adhesive tape as discussed and shown in the first two embodiments. The top sections 11*b*, 12*b* 13*b* and 14*b* are locked into their double wall position as shown in FIGS. 11 and 12 by the bottom insert 30 which is juxtaposed the bottom section 23*b*. The bottom insert 30 is made of a strong double ply corrugated cardboard in this specific embodiment and includes corners 30′ which are cut off on diametrically opposite points. These cut off corners 30′ serve as handle grips when lifting the bottom insert 30 and as vents when placing the bottom insert 30 into the box. The bottom insert 30 is shown in perspective in FIG. 20. A further feature of this embodiment is directed to the insertion of a corrugated cardboard ring (not shown) which may be placed between the side wall sections 1*b*, 2*b*, 3*b* and 4*b* and the top sections 11*b*, 12*b*, 13*b* and 14*b*. This type of structure provides a substantial reinforcement to the open box made in accordance with this invention.

It is seen from this third embodiment that the blank for forming a collapsible pallet box made in accordance with this invention is extremely versatile in that it may either form an open reinforced box or a standard collapsible box which is closable at the top thereof.

A further modification of this embodiment includes the use of square rods 10*b*′ made of such material as plastic or wood and placed in the bracing joists 2*b*′ and 4*b*′ as shown in FIG. 12.

Another embodiment of a blank made in accordance with this invention is shown in FIG. 13. The two-piece corrugated cardboard blank is asymmetric with respect to the center line *m* located on the center walls 1*c*, 2*c*, 3*c* and 4*c*. Adhesive flaps 1″ and 3″ are used to connect the exterior edges of the side wall sections 4*c* and 1*c* and 2*c* and 3*c* respectively. The tongue sections 21*c*′ used in the formation of the bracing joists 2*c*′ and 4*c*′ include grooves 28. Once the two pieces of the blank of this embodiment are secured to each other, the same procedure of construction and erection of the collapsible pallet box of this invention is effected as in the embodiment described with the blank shown in FIG. 1. The guide grooves 28 serve to engage the vertex edge of angled stiffener inserts 10 as used in previous embodiments. These grooves 28 are of course unnecessary when different forms of inserts such as square rods 10*b*′ are used in the carrier joists 2′ and 4′.

Figure 14:
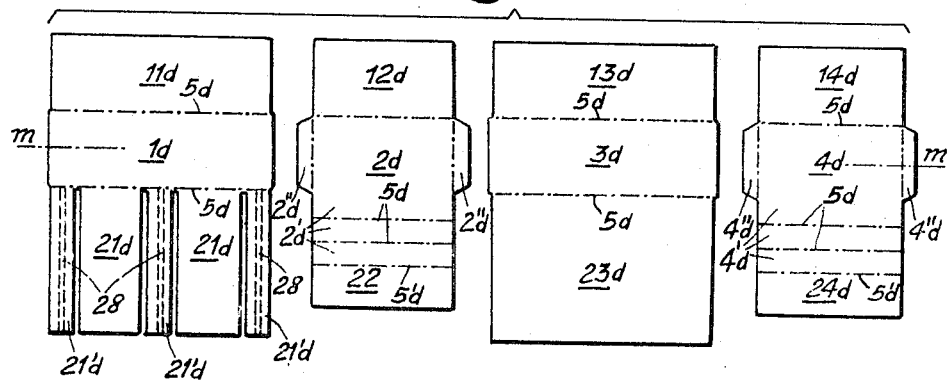
FIG. 14 is a plan view of a four-piece pallet box blank having an asymmetric form and made in accordance with this invention.

In another embodiment as shown in FIG. 14, a four-piece blank for forming a collapsible pallet box made in accordance with this invention includes wall panels that are similar to the one-piece blank wall panels shown in FIG. 5 and discussed hereinabove. The separate wall panels as shown in FIG. 14 include adhesive flaps 2*d*″ and 4*d*″ used to attach wall sections 2*d* and 4*d* to the respective edges of the wall sections 1*d* and 3*d*. Once the four wall panels have been so connected, the folding operation of this embodiment is the same as that discussed hereinabove with respect to the embodiment of FIG. 5.

Figure 15:
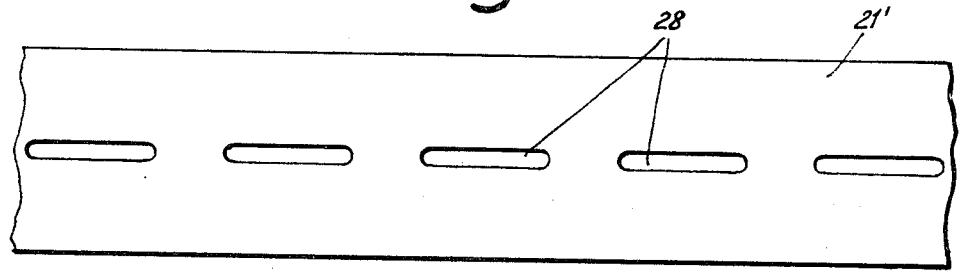
FIG. 15 is a partial sectional view of a tongue section showing a form of grooves used in the bracing joist structure of a pallet box made in accordance with this invention.

Guide grooves 28 are provided on the spacer tongue sections 21*d*′ of this embodiment and accomplish the same function as those guide grooves 28 in previous embodiments. These grooves 28 may be formed as impressions, slots, cutins or scores. An embodiment of these grooves 28 is shown in plan view in FIG. 15.

Several embodiments of stiffener inserts may be placed in the bracing joists 2′, 4′ or 26′ and other joists discussed hereinabove are shown in FIGS. 21 through 32. The embodiments as shown in FIGS. 21, 22, 23 and 24 include an interior V-shaped portion 29 and an exterior U-shaped portion 30. The stiffener members 10 of these figures are formed from a corrugated cardboard strip by folding along the fold lines 5, 5′ and 5″. The median fold 5 in FIG. 21 forms the vertex edge of the V section portion 29. The U-shaped section 30 is connected to the V-shaped section 29 by fold 5′ and the exterior fold lines 5″ form the corner edges of the U-shaped section 30. The longitudinal edges 10′ form a joint 10″ which serves for the engagement of the vertex edge of the V-shaped section 29.

The longitudinal edges 10′ are assembled in the hollow U-shaped section 30 by bending along the folds 5″ and the V-shaped section 29 has been formed by bending along the folds 5′. In the embodiment of FIG. 22, the longitudinal edges 10′ form the vertex edge of the V-section 29 and support the U-shaped web section 30 in the middle. The embodiment of FIG. 23 includes bevels on the front sides of the V-shaped section 29 which act as abutments for a terminal flap 32. This terminal flap 32 is an extension of the web of the U-shaped section 30 and is turned down between the legs of the U-shaped section 30. The two terminal flaps 32 afford an additional stiffening of the U-shaped section 30 at the ends of the stiffener insert 10. Small bevels 31 are also located on both ends of the U-shaped section 30 to permit an easy introduction of the stiffener element 10 into the joist 27 as shown in FIG. 21.

The embodiment of a stiffener element 10 as shown in FIG. 24 includes a vertex edge of the V-shaped section 29 to be formed by folds 5 from which the terminal flaps 29′ extend and abut against the inside of the U-shaped section 30. The abutment of the flaps 29′ against the inside of the U-shaped section 30 secures the center position of the vertex edge of the V-shaped section 29 inside the stiffener element 10.

The embodiment of a stiffener element 10 is shown in perspective view in FIG. 26 and in an inverted cross-sectional view in FIG. 25. This element 10 includes bracing flaps 33 which project from the edges 10′ and are turned down along the fold lines 5′. The ends of the bracing flaps 33 are propped along the fold line 5″ along the inside of the U-shaped section 30 and thereby provides stiffening thereto. Protruding terminal flaps 32 abut against a beveled end face of the exterior bracing flaps 33. Beveled edges 31 are also present in this specific embodiment of a stiffener insert 10. Serrations may be located along the longitudinal edges 10′ and along the bracing flaps 33 at the fold lines 5′ to provide partial interengagement and interlocking with the joist 27 as shown in FIG. 21.

Another embodiment of a stiffener insert 10 is shown in inverted views in FIGS. 27 and 28. Frontal extensions of the web of the U-shaped section 30 form terminal flaps 32. The flaps 32 include projections or lugs 34 which are engaged in slots 35 located on the side walls of the U-shaped section. The flaps 32 are locked in place in an inclined position between the side walls of the U-shaped section.

Another view of the stiffener insert 10 having a V-shaped angle section is shown in FIG. 29. A stiffener element having an X-shaped section is shown in FIG. 30. These stiffener elements of FIGS. 29 and 30 may be made of plastic or impregnated plain cardboard and are usable as self-bracing and stress producing stiffener inserts.

A further embodiment of a brace joist stiffener is shown in FIG. 31. This stiffener is a substantially prismatic elongated square filler body 40 which comprises a plurality of corrugated cardboard layers 41. The ends of these layers are interconnected with an adhesive tape 42 thereby forming slightly tapered ends on the stiffener element. This shape facilitates the insertion of the filler 40 into the bracing joist of the box made in accordance with this invention. A flat section 44 is inserted into a recess 43 located at a median position 41' to act as a tensor. The tensor flap 44 is composed of a resilient material and has sufficient initial stress that the filler member 40 swells slightly outwardly along the center portion thereof. When the tapered and swollen filler member 40 is inserted into a brace joist, it is compressed and the hollow space of the joist is thereby entirely filled. The tensor elements 44 produce a pressure from the inside of the filler 40 to the outside and thus insure the tight fitting of the filler within the brace joist. This type of a stiffener insert is extremely useful in a collapsible box made in accordance with this invention when it is maintained under the stresses occurring in the transportation of goods.

Another filler member 40' which is to be inserted in the hollow space of the bracing joist is shown in FIG. 32. The filler member 40' has a shape of a square prism and is composed of an expanded or foamed plastic which is light and therefore advantageous as a stiffening member. Open ended median slots 45 are provided at opposite ends of the filler 40'. This structure provides a resiliency along the cross-section of the filler 40' and the ends therefore may be compressed to a narrow width to facilitate insertion into the hollow space of the bracing joist. A bracing wedge 46 is then insertable into the slots 45 after the filler 40' has been placed in the joist. The wedge 46 spreads the ends of the filler 40' apart and thereby maintains a stress along the inside surface of the joist member.

The elements 42, 43 and 46 used in the construction of the stiffener elements 40 and 40' prevent the said fillers from dropping out of the joist when the pallet box is subjected to various types of extreme pressures during transportation of goods.

Figure 16:
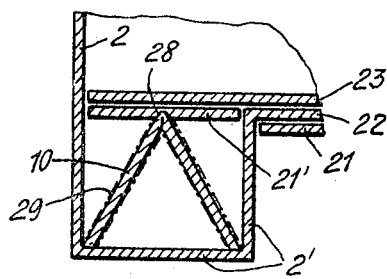
FIGS. 16, 17, 18 and 19 are cross-sectional views of various types of bracing joist structures used in pallet boxes made in accordance with this invention.
Figure 18:
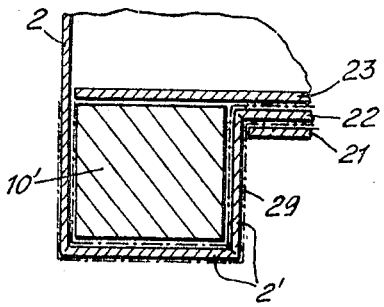
Figure 17:
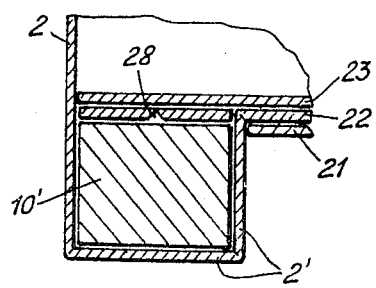
Figure 19:
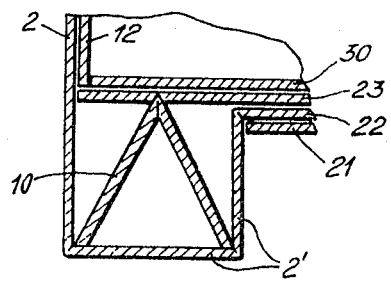

The embodiments of stiffener elements 10 as shown in FIGS. 16 and 18 include the use of a water repellant protective coating such as the plastic foil 29. This enhances the usefulness and life of the collapsible box of this invention.

Having thus set forth and disclosed the nature of this invention, what is claimed is:

1. A collapsible pallet box comprising
   (a) means connecting four wall panels side by side to form a rectangular container,
   (b) each said wall panel including a top section, a side wall section and a bottom section, said wall panel sections being separated by folding lines,
   (c) a first wall panel having a folded bottom section which forms an inner bottom ply of said box,
   (d) a second and third wall panel being located on opposite sides of said box with respect to each other and having folded bottom sections,
   (e) said second and third wall panel bottom sections form a hollow brace joist along opposite bottom edges of said box and at least a portion of said bottom sections comprise an intermediate bottom ply juxtaposed said inner box bottom ply,
   (f) a fourth wall panel being located opposite said first wall panel and having a folded bottom section which forms an outer box bottom ply juxtaposed said intermediate ply.

2. A box as defined in claim 1 wherein said hollow brace joist is rectangular in cross-section with a fold line located at each bottom corner thereof.

3. A box as defined in claim 2 wherein said hollow brace joist is square in cross-section with a fold line located at the top thereof to join said joist structure to the portion of the bottom section which forms a part of the intermediate ply.

4. A box as defined in claim 3 wherein said fourth wall panel bottom section includes a folded tongue section located along the top length of each said hollow brace joist.

5. A box as defined in claim 4 wherein said connecting means between two adjacent wall panels includes an adhesive material and the remaining connecting means comprise a contiguous one-piece construction between said wall panels.

6. A box as defined in claim 1 wherein said box bottom includes an intermediate hollow brace joist located between the hollow brace joists disposed at opposite edges thereof, said intermediate brace joist includes flange portions at the top thereof juxtaposed said inner box bottom ply to form a portion of said intermediate box bottom ply.

7. A box as defined in claim 6 wheerin said fourth wall panel bottom section includes a folded tongue section located along the top length of each said hollow brace joist.

8. A box as defined in claim 1 wherein said second and third wall panels are located in adjacent separate blank sections, said connecting means between said blank sections include an adhesive material and the remaining connecting means comprises contiguous one-piece construction between the other juxtaposed wall panels.

9. A box as defined in claim 1 wherein each said wall panel is located in adjacent separate blank sections, said connecting means between said blank sections includes an adhesive material.

10. A box as defined in claim 9 wherein said connecting means include gluing flaps integrally formed with said blank sections to effect joining between said blanks.

11. A box as defined in claim 1 wherein said top sections are separated from said side wall sections by two parallel folding lines to allow said top sections to be turned down 180° to form an inside wall panel, said box includes a bottom insert to hold said turned down sections in position to form an open top box.

12. A box as defined in claim 1 wherein said box includes a self-bracing and tensing supporting stiffener insert element located inside each said hollow brace joist.

13. A box as defined in claim 12 wherein said stiffener element is covered with a water-repellant protective coating.

14. A box as defined in claim 12 wherein said stiffener element has a solid rectangular cross-section which substantially fills the hollow space within said brace joist.

15. A box as defined in claim 12 wherein said stiffener insert element includes serrations which partly interdigitate wtih serrations located within said brace joist.

16. A box as defined in claim 12 wherein said stiffener insert element includes a V-shaped portion having a vertex edge located within a guide groove structure located along the top of said brace joists.

17. A box as defined in claim 16 wherein said stiffener further includes a U-shaped portion which is integrally formed with said V-shaped section.

18. A box as defined in claim 17 wherein said U-shaped portion includes a guide groove and said V-shaped section includes two free leg portions having longitudinal edges which fit into said guide groove.

19. A box as defined in claim 17 wherein said U-shaped section includes terminal end flaps which are turned down between legs of said U-shaped portion and abut against beveled end faces located on said U-shaped portion.

20. A box as defined in claim 12 wherein said stiffener element includes a U-shaped portion including integrally formed bracing flaps which are turned down into the hollow space of said U-shaped section and terminal end flaps which provide additional support at the ends thereof.

21. A box as defined in claim 12 wherein said stiffener element is constructed of a material selected from the group consisting of corrugated cardboard, impregnated corrugated cardboard, impregnated planar cardboard, plastic and wood.

22. A box as defined in claim 14 wherein said stiffener element has a narrow width at the ends thereof to facilitate placement of the elements in said bracing joist.

23. A box as defined in claim 22 wherein said element includes a tensor element composed of a tensioned elastic material, said tensor element being located in a recess located in said element.

24. A box as defined in claim 23 wherein said element includes a plurality of layers and said tensor element is in the median portion of said element.

25. A box as defined in claim 22 wherein said element has notches in the ends thereof and wedge members to spread said ends when said element is located in said bracing joist.

26. A box as defined in claim 25 wherein said element is composed of hard foamed plastic.

27. A collapsible pallet box blank comprising (a) a continuous one-piece sheet having four wall panels,
(b) each said wall panel including a top section, a side wall section and a bottom section, said wall panel sections being separated by folding lines,
(c) a first wall panel having a bottom section to form an inner bottom ply of said box,
(d) a second and third wall panel having a bottom section including fold lines to form a hollow brace joist along one bottom edge of said box and at least a portion of an intermediate bottom ply juxtaposed said inner bottom ply,
(e) at least one of said second and third wall panels being contiguous to an edge of said first wall portion,
(f) a fourth wall panel having a bottom section to form an outer bottom ply juxtaposed said intermediate ply, and having at least one foldable tongue section to be placed above the top length of each hollow brace joint to be formed on said box bottom.

28. A blank as defined in claim 27 wherein said fold lines in said second and third wall panel bottom sections are equally spaced from each other to form a hollow brace joist which is square in cross-section.

References Cited

UNITED STATES PATENTS

| | | | |
|---|---|---|---|
| 940,782 | 4/1909 | Bird | 229—37 XR |
| 2,142,142 | 1/1939 | Newsom. | |
| 2,444,183 | 6/1948 | Cahners | 229—49 XR |
| 2,494,730 | 1/1950 | Thursby | 229—49 XR |
| 2,609,136 | 9/1952 | Sider | 108—51 XR |
| 3,026,015 | 3/1962 | Severn | 108—56 XR |
| 3,126,144 | 3/1964 | McCulloch. | |
| 3,199,764 | 8/1965 | Oliver et al. | |
| 3,474,475 | 3/1969 | Achermann et al. | |

DAVIS T. MOORHEAD, Primary Examiner

U.S. Cl. X.R.

229—23, 49; 108—51